United States Patent
Yu et al.

(10) Patent No.: US 11,720,409 B2
(45) Date of Patent: Aug. 8, 2023

(54) RESOURCE PROCESSING METHOD AND APPARATUS, AND STORAGE MEDIUM

(71) Applicant: BAIDU ONLINE NETWORK TECHNOLOGY (BEIJING) CO., LTD., Beijing (CN)

(72) Inventors: Cong Yu, Beijing (CN); Yuanxu Liu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 289 days.

(21) Appl. No.: 17/341,827

(22) Filed: Jun. 8, 2021

(65) Prior Publication Data

US 2021/0294664 A1    Sep. 23, 2021

Related U.S. Application Data

(63) Continuation of application No. PCT/CN2020/116993, filed on Sep. 23, 2020.

(30) Foreign Application Priority Data

Jun. 5, 2020   (CN) .................. 202010506731.9

(51) Int. Cl.
*G06F 9/46* (2006.01)
*G06F 9/50* (2006.01)

(52) U.S. Cl.
CPC .......... *G06F 9/5055* (2013.01); *G06F 9/5038* (2013.01); *G06F 9/5077* (2013.01); *G06F 2209/503* (2013.01); *G06F 2209/506* (2013.01); *G06F 2209/5011* (2013.01)

(58) Field of Classification Search
CPC ..... G06F 9/5055; G06F 9/5038; G06F 9/5077
See application file for complete search history.

(56) References Cited

U.S. PATENT DOCUMENTS

2017/0132651 A1    5/2017  Lopez et al.

FOREIGN PATENT DOCUMENTS

| CN | 102739770 A | 10/2012 |
|---|---|---|
| CN | 106570719 A | 4/2017 |
| CN | 109428910 A | 3/2019 |
| CN | 109670847 A | 4/2019 |
| JP | 2019528540 A | 10/2019 |

OTHER PUBLICATIONS

Office Action issued for corresponding Japanese patent application 2021-537045, dated Sep. 13, 2022 (8 pages).
International Search Report issued in International Application No. PCT/CN2020/116993 dated Feb. 23, 2021 (5 pages).
Written Opinion issued in International Application No. PCT/CN2020/116993 dated Feb. 23, 2021 (4 pages).

*Primary Examiner* — Gregory A Kessler
(74) *Attorney, Agent, or Firm* — Osha Bergman Watanabe & Burton LLP

(57) ABSTRACT

A resource processing method and apparatus are proposed in the embodiment of the present disclosure. The method includes: obtaining a resource allocation scenario; querying a corresponding strategy combination configuration according to the resource allocation scenario; executing each allocation strategy to determine a target resource pool allocated with the allocation strategy; obtaining resources corresponding to each allocation strategy from the target resource pool allocated with the allocation strategy; executing the combination operation on the resources corresponding to the allocation strategy to obtain target resources.

15 Claims, 6 Drawing Sheets

RESOURCE PROCESSING METHOD AND APPARATUS, AND STORAGE MEDIUM

CROSS-REFERENCE TO RELATED APPLICATION

The present application is a continuation application of International Application No. PCT/CN2020/116993, which is based upon and claims priority to Chinese Patent Application No. 202010506731.9, filed on Jun. 5, 2020, the entirety contents of which are incorporated herein by reference.

TECHNICAL FIELD

The present disclosure relates to a field of data processing and terminal technology, particularly to video stream push and virtual reality (VR), specifically to a resource processing method and apparatus, and a storage medium.

BACKGROUND

With constant development of Internet technology and terminal technology, various Applications, APPs for short, have sprung up. In order to increase user stickiness and enhance the user's sense of participation and fun, various APPs may allocate corresponding resources to the user, such as, virtual items including red packets, gold coins and credits, and physical items can also be allocated.

In related art, according to different user interaction scenarios, specific lottery codes are written to achieve accurate allocation of resources.

SUMMARY

The present disclosure aims at solving one of the above technical problems at least to a certain extent.

A resource processing method is proposed in the embodiment of the present disclosure, including: obtaining a resource allocation scenario; querying a corresponding strategy combination configuration according to the resource allocation scenario; wherein, the strategy combination configuration is configured to indicate a combination operation between at least two allocation strategies; executing each allocation strategy to determine a target resource pool allocated with the allocation strategy; obtaining resources corresponding to each allocation strategy from the target resource pool allocated with the allocation strategy; executing the combination operation on the resources corresponding to the allocation strategy to obtain target resources.

A resource processing apparatus is proposed in the embodiment of the present disclosure, including: an obtaining module, configured to obtain a resource allocation scenario; a querying module, configured to query a corresponding strategy combination configuration according to the resource allocation scenario; wherein, the strategy combination configuration is configured to indicate a combination operation between at least two allocation strategies; an execution module, configured to execute each allocation strategy to determine a target resource pool allocated with the allocation strategy; an allocation module, configured to obtain resources corresponding to each allocation strategy from the target resource pool allocated with the allocation strategy; an operation module, configured to execute the combination operation on the resources corresponding to the allocation strategy to obtain target resources.

An electronic device is provided in a third aspect of the embodiment of the present disclosure, and includes: at least one processor; and a memory communicating with the at least one processor; wherein, the memory stores instructions executable by the at least one processor, when the instructions are executed by the at least one processor, the at least one processor is caused to execute the method as described in the first aspect of the embodiment of the present disclosure.

A non-transitory computer-readable storage medium storing computer instructions is proposed in a fourth aspect of the embodiment of the present disclosure, in which when the computer instructions are executed, a computer is caused to execute the method described in the first aspect of the embodiment of the present disclosure.

Embodiment of the above disclosure has following advantages and beneficial effects: by presetting the corresponding relationship between resource allocation scenarios and strategy combination configuration, when the resource allocation scenario change, only resource pools and allocation strategies need to be adjusted, which facilitates flexible configuration and meets resource allocation requirements in most scenarios. Moreover, when allocation strategies are adjusted, allocation strategy configuration may be flexibly adjusted according to the participation and target of the resource allocation object, which may further reduce complexity of the system and improves the maintainability of the code on the basis of cost saving.

Other effects of the above alternative ways will be described below in combination with the specific embodiment.

BRIEF DESCRIPTION OF THE DRAWINGS

The drawings are intended to better understand the solution, and do not constitute a limitation to the disclosure. The above and/or additional aspects and advantages of the present disclosure will become obvious and easy to understand from following description of the embodiments in conjunction with the accompanying drawings, in which.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in following descriptions.

The present disclosure proposes resource processing method and apparatus, an electronic device, and a storage medium to meet requirements of resource allocation in most scenarios and save cost, which solves the technical problems of customized modification on lottery codes, increased cost, low applicability and unable to meet the resource allocation requirement in other scenarios when scenarios change or need to be adjusted in related art.

A resource processing method and apparatus, an electronic device and a storage medium are described referring to figures in embodiments of the present disclosure.

Figure 1:
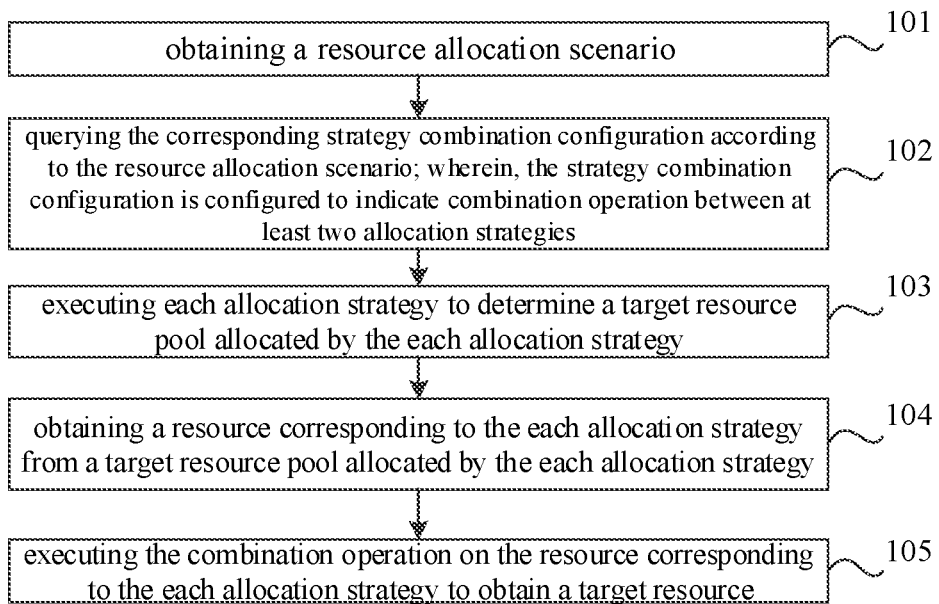
FIG. 1 is a flowchart illustrating a resource processing method provided in a first embodiment of the present disclosure.

FIG. 1 is a flowchart illustrating a resource processing method provided in the first embodiment of the present disclosure.

The embodiment of the present disclosure illustrates that the resource processing method is configured in a resource processing apparatus. The resource processing apparatus may be applied to any electronic device so that the electronic device may perform resource processing function.

The electronic device may be a device with computing capacity, for example, a personal computer (PC), a mobile terminal, a server, etc. The mobile terminal may be, for example, a mobile phone, a tablet computer, a personal digital assistant, a wearable device, a vehicle-mounted device, and other hardware devices with various operating systems, touch screens, and/or display screens.

As illustrated in FIG. 1, the resource processing method may include followings.

At block 101, a resource allocation scenario is obtained.

In the embodiments of the present disclosure, the resources may include virtual items and/or physical items, in which the virtual items may be red packets, credits, gold coins, energy, game coins, electronic vouchers, etc. It should be understood that, when the resource allocation objects are different, the resource allocation scenarios may be same or may be different. The resource allocation target may be a person.

For example, when different users log in to an APP, the corresponding resource allocation scenarios may be different. For example, when the user logs in to an APP for the first time, the corresponding resource allocation scenario is scenario 1, and when the user logs in to then APP for the first time and completes the first task, the corresponding resource allocation scenario is scenario 2, and when the user does not log in to the APP for the first time, but completes a preset task, such as inviting friends, browsing an APP for the preset duration, or sharing preset activities to social APPs, such as WeChat Moments, Microblog, etc., the corresponding resource allocation scenario is scenario 3, and so on.

In embodiments of the present disclosure, the current resource allocation scenario may be determined according to login information and operation information of the resource allocation object.

At block 102, a corresponding strategy combination configuration is queried according to the resource allocation scenario; in which, the strategy combination configuration is configured to indicate a combination operation between at least two allocation strategies.

It can be understandable that, in some resource allocation scenarios, there may be cases that multiple allocation strategies are matched at the same time, for example, when the resource is a red packet, the allocation strategy of the red packet is a lottery strategy, and when the user logs in an APP for the first time and completes the first task, two lottery strategies may be matched at the same time.

Therefore, in the embodiment of the present disclosure, in order to achieve precise resource allocation for the resource allocation object, the corresponding relationship between each resource allocation scenario and the strategy combination configuration may be preconfigured, so that when the current resource allocation scenario is determined, the above corresponding relationship may be queried to determine the matching strategy combination configuration. Each strategy combination configuration includes at least two allocation strategies, and indicates a combination operation between the at least two allocation strategies, such as a summing processing operation.

For example, the strategy combination configuration corresponding to the scenario n includes three allocation strategies, namely "gold", "firstlogin" and "big", and at the same time, the strategy combination configuration corresponding to scenario n indicates that the combination operation among the above three allocation strategies is summing processing.

As an example, the strategy combination configuration may be configured by adopting a j son protocol, and the source program code of the strategy combination configuration may be as follows:

```
"gold_redpacket" :{
    "open_strategy" :{
        "list" :["gold", "firstlogin", "big"],
        "op" : "sum"
    }
}
``` where "list" includes the respective allocation strategies, "op" is configured to indicate the combination operation between two allocation strategies, "sum" represents the summing processing, and "redpacket" represents details of resources allocation strategies.

At block 103, each allocation strategy is executed to determine a target resource pool allocated with the allocation strategy.

In the embodiment of the present disclosure, a resource pool is configured to allocate the size and quantity of allocated resources, for example, when a resource is a red packet, a resource pool is a red packet pool, and a red packet pool is configured to allocate the amount and quantity of the red packet.

As an example, a resource pool is configured by adopting the j son protocol, and a resource is taken as a red packet, the red packet pool may be configured as follow:

```
"3": {
"desc": "中奖红包 (Chinese characters, which means a
    won read packet)",
"min": 135,
"max": 139,
"total": 140000,
},
``` where "3" represents an identification of the red packet pool, "desc" represents a description of the red packet, "min" represents the minimum amount of the red packet, "max" represents the maximum amount of the red packet, and "total" represents the number of the red packets, when "total" does not exist, it means that the number of red packets is not limited.

In the embodiment of the present disclosure, when strategy allocation configuration is determined, each allocation strategy included in the strategy allocation configuration may be executed to determine a target resource pool allocated by each allocation strategy.

Still taking the above example as an example, when the resource is a red packet, "gold", "firstlogin" and "big" may be executed to determine that the target resource pool allocated by "gold" is a red packet pool 3, the target resource pool allocated by "firstlogin" is a red packet pool 4, and the target resource pool allocated by "big" is a red packet pool 5.

At block 104, resources corresponding to each allocation strategy are obtained from the target resource pool allocated with the allocation strategy.

In the embodiment of the present disclosure, after the target resource pools allocated by the respective allocation strategies are determined, the resources corresponding to the corresponding allocation strategy may be obtained from the target resource pool.

Still taking the above example, when the resource is a red packet, the resource pool is a red packet pool, and each red packet pool is configured with the corresponding minimum amount, the maximum amount, and the number of red packets, so that the corresponding red packet amount may be obtained from the corresponding red packet pool according to the configuration information of each red packet pool.

At block 105, the combination operation is executed on the resources corresponding to the allocation strategy to obtain target resources.

In embodiments of the present disclosure, when the resource corresponding to each allocation strategy is determined, combination operation may be performed on the resources corresponding to each allocation strategy to obtain a target resource, so that the corresponding target resource may be allocated to the resource allocation object.

Still taking the above example, when the corresponding red packets are obtained from the red packet pools corresponding to each allocation strategy, all red packets may be added to obtain the amount to be allocated to the resource allocation object.

It should be noted that the above embodiments merely take the resource as the red packet for an example. In actual applications, resources may also be virtual items such as gold coins and energy, or may also be physical items, which are not limited in the present disclosure. For example, in a reading scenario, for a reading or news APP, when a user logs in, gold coins may be allocated to the user according to the user's reading duration, or operations such as inviting friends by the user, etc.; in the answering scenario, for an answering APP, after the user logs in, red packets or small gifts and the like may be allocated to the user according to the user's answer; in the video scenario, for video APPs or live broadcast APPs, electronic vouchers, red packets, and small gifts may be allocated to the user according to the user's participation; in the game scenario, for game APPs, such as interaction games, game prizes such as interface skins, or game equipment and the like may be allocated to the player according to the player's level and tasks performed by the player.

The resource processing method in the embodiment of the present disclosure, a resource allocation scenario is obtained, the corresponding strategy combination configuration is queried according to the resource allocation scenario, and then each allocation strategy in the strategy combination configuration is executed to determine a target resource pool allocated by each allocation strategy; and a resource corresponding to the each allocation strategy is obtained from a target resource pool allocated by the each allocation strategy; and the combination operation is executed on the resource corresponding to the each allocation strategy to obtain a target resource. In the present disclosure, the corresponding relationship between a resource allocation scenario and a strategy combination configuration is preset, and when resource allocation scenario changes, only the resource pool and the allocation strategy need to be adjusted, which facilitates flexible configuration and meets resource allocation requirements in most scenarios. Moreover, when the allocation strategy is adjusted, allocation strategy configuration may be flexibly adjusted according to the participation and target of the resource allocation object without necessary to modify codes, which may reduce complexity of the system, improve the maintainability of the code, and saving the cost at the same time.

In actual applications, each allocation strategy may include a plurality of sub-strategies. When each allocation strategy is executed, it is verified whether the resource allocation object meets the triggering condition indicated by the respective sub-strategies corresponding to each allocation strategy. If yes, the resource pool matched with the sub-strategy may be calculated according to the corresponding rules, and the resource corresponding to the corresponding sub-strategy is determined according to the configuration of the resource pool, and then combination operation is performed on the resources with sub-strategies to obtain a target resource, so as to improve the accuracy and reliability of resource calculation.

The above process is described in detail below in combination with the second embodiment.

Figure 2:
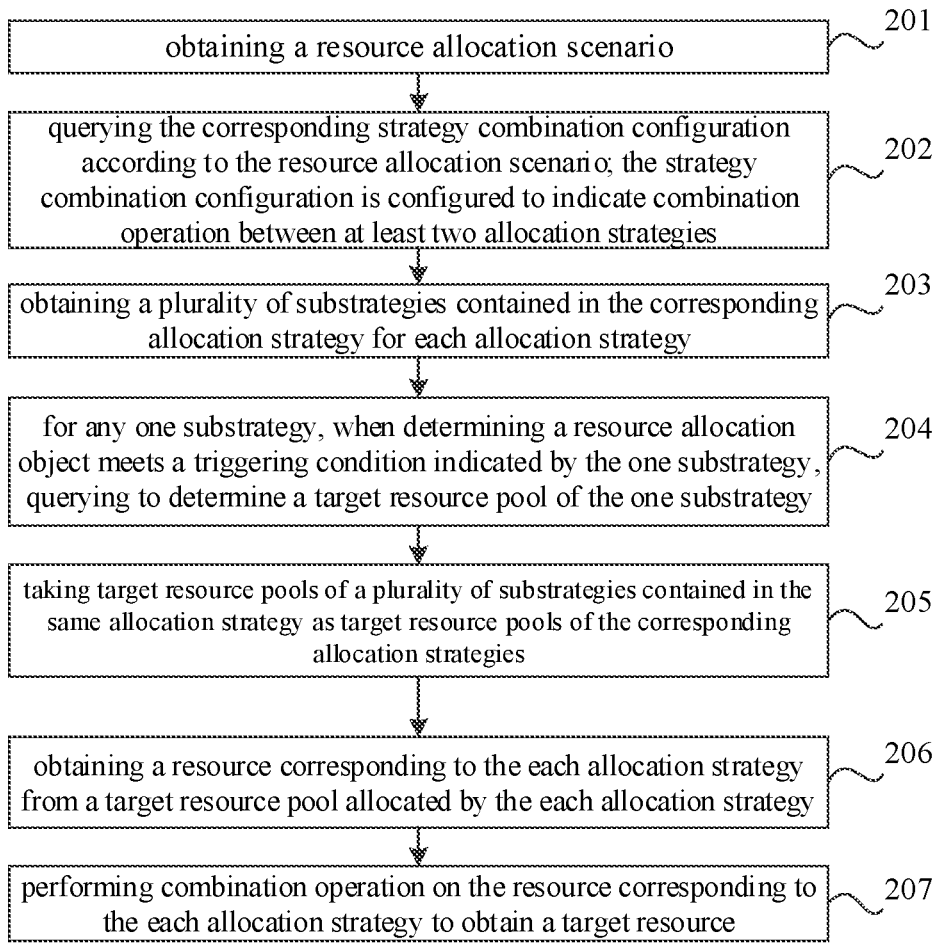
FIG. 2 is a flowchart illustrating a resource processing method provided in a second embodiment of the present disclosure.

FIG. 2 is a flowchart illustrating a resource processing method provided in the second embodiment of the present disclosure.

As illustrated in FIG. 2, the resource processing method may include followings.

At block 201, a resource allocation scenario is obtained.

At block 202, a corresponding strategy combination configuration is queried according to the resource allocation scenario; in which, the strategy combination configuration is configured to indicate a combination operation between at least two allocation strategies.

The execution process of blocks 201 to 202 may refer to the execution process of blocks 101 to 102 in the above embodiments, which will not be repeated here.

At block 203, a plurality of sub-strategies contained in each allocation strategy are obtained.

In the embodiment of the present disclosure, the corresponding relationship between each allocation strategy and each sub-strategy contained may be preset, so that the corresponding relationship may be queried to determine a plurality of sub-strategies contained in the corresponding allocation strategies when the respective allocation strategies are determined.

As an example, the allocation strategy may be configured by adopting a json protocol, and the source program code configured by the allocation strategy may be as follows:

{"big" :{
    "upper_limit" :1,
    "redpacket" :[

```
{
    "condition" : "activity_play_times=1",
    "percent" : [0.46, 0.025, 0.01, 0.005],
    "pool" : ["3", "4", "5", "6"]
{,
}
    "condition" : "activity_play_times=2",
    "percent" : [0.69, 0.0375, 0.015, 0.0075],
    "pool" : ["3", "4", "5", "6"]
}
]
}
}
``` where "big" represents an allocation strategy name, which may be customized; upper_limit represents the maximum times of the allocation strategy matched or hit by the resource allocation object; redpacket represents the resource allocation strategy details, which may include a plurality of parallel sub-strategies; condition represents the condition of matching the sub-strategies, which is optional; percent represents matching probability, that is, a ratio of the matched times to the total matching times; pool represents a resource pool, which has a one-to-one correspondence with "percent".

For example, according to configuration information of the above allocation strategy "big", an allocation strategy "big" includes two parallel sub-strategies.

At block 204, for any one sub-strategy, a target resource pool of the sub-strategy is queried and determined when it is determined that a resource allocation object meets a triggering condition indicated by the sub-strategy.

In the embodiment of the present disclosure, a triggering condition corresponding to each sub-strategy is preset, for example, the triggering condition corresponding to sub-strategy 1 is login of the resource allocation object for the first time, the triggering condition corresponding to sub-strategy 2 is login of the resource allocation object for the second time, and the triggering condition corresponding to sub-strategy 3 is completing the first task by the resource allocation object.

In the embodiment of the present disclosure, for each sub-strategy, it may be determined whether a resource allocation object meets a triggering condition indicated by the one sub-strategy. If yes, a target resource pool of the sub-strategy is queried and determined; if no, other sub-strategies are continued to be calculated.

As an example, referring to block 203, the triggering condition corresponding to a first sub-strategy is "activity_play_times=1". If the user participates in the activity for the first time, it is determined that the user meets the triggering condition indicated by the sub-strategy. At this time, the matched resource pool may be calculated from the resource pools corresponding to identifications "3", "4", "5", "6" with a random probability. The triggering condition corresponding to a first sub-strategy is "activity_play_times=2". If the user participates in the activity for the second time, it is determined that the user meets the triggering condition indicated by the sub-strategy. At this time, a selected resource pool may be calculated by random probability in the same way.

At block 205, target resource pools of the plurality of sub-strategies contained in the same allocation strategy are determined as target resource pools of the corresponding allocation strategy.

At block 206, resources corresponding to each allocation strategy are obtained from the target resource pool allocated with the allocation strategy.

In the embodiment of the present disclosure, when the target resource pool allocated by each allocation strategy is determined, the resource corresponding to the corresponding allocation strategy may be determined according to configuration of each target resource pool.

At block 207, the combination operation is executed on the resources corresponding to the allocation strategy to obtain target resources.

The execution process of block 207 may refer to the execution process of block 105 in the above embodiments, which will not be described in detail herein.

In a possible implementation of the embodiment of the present disclosure, each allocation strategy and/or sub-strategy may indicate the corresponding candidate resource pool or allocation probability of the corresponding candidate resource pool. For each allocation strategy and/or sub-strategy, a target resource pool of the allocation strategy/sub-strategy may be determined from each candidate resource pool according to allocation probability of each candidate resource pool. The above process is described in detail below in combination with the third embodiment.

Figure 3:
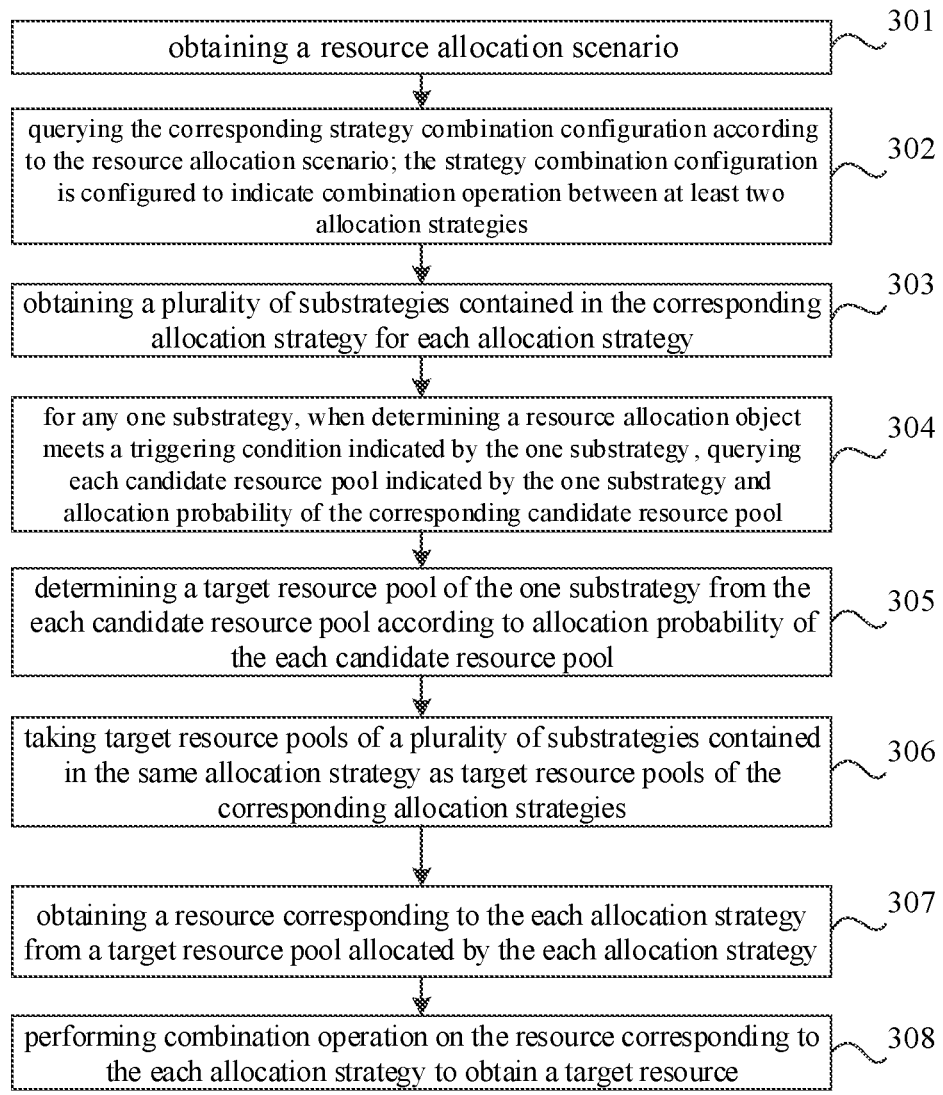
FIG. 3 is a flowchart illustrating a resource processing method provided in a third embodiment of the present disclosure.

FIG. 3 is a flowchart illustrating a resource processing method provided in the third embodiment of the present disclosure.

As illustrated in FIG. 3, the resource processing method may include followings.

At block 301, a resource allocation scenario is obtained.

At block 302, a corresponding strategy combination configuration is queried according to the resource allocation scenario; in which, the strategy combination configuration is configured to indicate a combination operation between at least two allocation strategies.

At block 303, a plurality of sub-strategies contained in each allocation strategy are obtained.

The execution process of blocks 301 to 303 may refer to the execution process of the above embodiments, which will not be repeated here.

At block 304, for any one sub-strategy, when it is determined that a resource allocation object meets a triggering condition indicated by the sub-strategy, candidate resource pools indicated by the sub-strategy and allocation probabilities of the candidate resource pools are queried.

In the embodiment of the present disclosure, information of the resource allocation object may be stored by the condition source. For example, the condition source may center on user data. In the present disclosure, it may be determined whether the resource allocation object meets the triggering condition indicated by each sub-strategy according to the information of the resource allocation object recorded by the condition source. If yes, each candidate resource pool indicated by each sub-strategy and allocation probability of the corresponding candidate resource pool may be determined according to the configuration information corresponding to each sub-strategy.

As an example, referring to block 203, the candidate resource pools indicated by the sub-strategy corresponding to the triggering condition "activity_play_times=1" are resource pools corresponding to identifications "3", "4", "5", "6", allocation probability of the candidate resource pool with identification "3" is 0.46, allocation probability of the candidate resource pool with identification "4" is 0.025, allocation probability of the candidate resource pool with identification "5" is 0.01, and allocation probability of the candidate resource pool with identification "6" is 0.005; the candidate resource pools indicated by the sub-strategy corresponding to the triggering condition "activity_play_times=2" are resource pools corresponding to identifications "3", "4", "5", "6", allocation probability of the candidate resource pool with identification "3" is 0.69, allocation probability of the candidate resource pool with identification "4" is 0.0375, allocation probability of the candidate resource pool with identification "5" is 0.015, and allocation probability of the candidate resource pool with identification "6" is 0.0075.

It needs to be noted that, the present disclosure only illustrates the candidate resource pools indicated by two sub-strategies are the same. In actual applications, the candidate resource pools indicated by different sub-strategies may be the same or may be different, which will not be limited here.

At block 305, the target resource pool of the sub-strategy is determined from the candidate resource pools according to the allocation probabilities of candidate resource pools.

In the embodiment of the present disclosure, allocation probability indicates a probability of the corresponding candidate resource pool being selected, and it may be determined whether the candidate resource pool is selected for the current resource allocation object according to allocation probability of each candidate resource pool, in which, each candidate resource pool selected by the resource allocation object is random, and the candidate resource pool selected by the resource allocation object may be calculated with a random probability.

At block 306, target resource pools of the plurality of sub-strategies contained in the same allocation strategy are determined as target resource pools of the corresponding allocation strategy.

At block 307, resources corresponding to each allocation strategy are obtained from a target resource pool allocated by the allocation strategy.

At block 308, combination operation is performed on the resources corresponding to the allocation strategy to obtain a target resource.

The execution process of blocks 306 to 308 may refer to the execution process of the above embodiments, which will not be repeated here.

In the embodiment of the present disclosure, the target resource pool of the sub-strategy is determined from the candidate resource pools based on the allocation probabilities of the respective candidate resource pools, which may enhance accuracy of determining result by a target resource pool and improve accuracy and reliability of subsequent resource allocation.

It should be understood that the resource is limited. The upper limit of the execution times corresponding to each allocation strategy may be set to avoid resources obtained unlimited by a resource allocation object. Before each allocation strategy is executed, it may be determined whether execution times of each allocation strategy executed by the resource allocation object is less than the corresponding upper limit, if no, a processing procedure may be stopped, and if yes, the corresponding allocation strategy is executed.

The above process is described in detail below in combination with the fourth embodiment.

Figure 4:
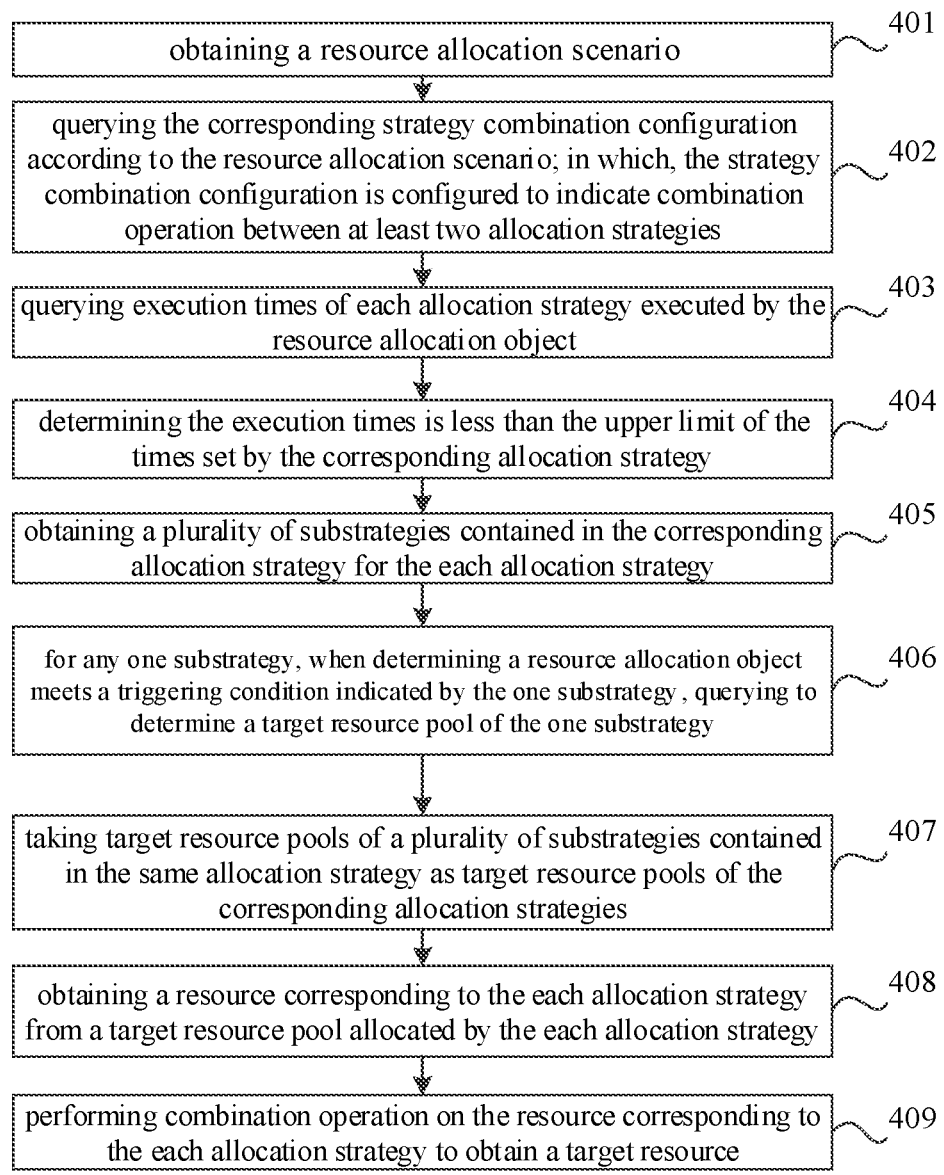
FIG. 4 is a flowchart illustrating a resource processing method provided in a fourth embodiment of the present disclosure.

FIG. 4 is a flowchart illustrating a resource processing method provided in the fourth embodiment of the present disclosure.

As illustrated in FIG. 4, the resource processing method may include followings.

At block 401, a resource allocation scenario is obtained.

At block 402, a corresponding strategy combination configuration is queried according to the resource allocation scenario; in which, the strategy combination configuration is configured to indicate a combination operation between at least two allocation strategies.

The execution process of blocks 401 to 402 may refer to the execution process of blocks 101 to 102 in the above embodiments, which will not be repeated here.

At block 403, execution times of each allocation strategy executed by the resource allocation object are queried.

In the embodiment of the present disclosure, information that needs to be stored in the resource allocation process may be stored through the hit record. For example, the hit record may store executions times of each allocation strategy, the total number of resources allocated by the resource pool (for example, the amount of red packets allocated by the red packet pool), and the resources allocated by the resource allocation object each time (for example, the amount of red packets allocated by each user each time), etc. Therefore, in the present disclosure, executions times of each allocation strategy executed by the resource allocation object may be queried from the hit record.

At block 404, the execution times is determined less than the upper limit of the times set by the corresponding allocation strategy.

In the embodiment of the present disclosure, it may be determined whether execution times of each allocation strategy executed by the resource allocation object exceeds the upper limit of times set by the corresponding allocation strategy, if the execution times of each allocation strategy executed by the resource allocation object is greater than or equal to the upper limit of times set by the corresponding allocation strategy, processing process may be stopped; if the execution times of each allocation strategy executed by the resource allocation object is less than the upper limit of times set by the corresponding allocation strategy, the corresponding allocation strategy is executed.

As an example, referring to the step 203, the upper limit of times set by the allocation strategy is 1 ("upper_limit": 1), when the execution times of the allocation strategy executed by the resource allocation object is greater than or equal to 1, processing process may be stopped, and when the execution times of the allocation strategy executed by the resource allocation object is equal to 0, the allocation strategy may be executed.

At block 405, a plurality of sub-strategies contained in each allocation strategy are obtained.

At block 406, for any one sub-strategy, a target resource pool of the sub-strategy is queried and determined when it is determined that a resource allocation object meets a triggering condition indicated by the sub-strategy.

At block 407, target resource pools of the plurality of sub-strategies contained in the same allocation strategy are determined as target resource pools of the corresponding allocation strategy.

At block 408, resources corresponding to each allocation strategy are obtained from the target resource pool allocated with the allocation strategy.

At block 409, the combination operation is executed on the resources corresponding to the allocation strategy to obtain target resources.

The execution process of blocks 405 to 409 may refer to the execution process of the above embodiments, which will not be repeated here.

In a possible implementation of the embodiment of the present disclosure, in order to improve the precision of resource allocation, when the resource allocation object meets different sub-strategies in the same allocation strategy, the execution times of the corresponding allocation strategy need to be updated according to the number of sub-strategies. Specifically, when a target resource pool allocated by one sub-strategy is queried and determined, if the resource allocation object meets a triggering condition indicated by at least one sub-strategy in the same allocation strategy, execution times of the corresponding allocation strategy are updated and stored.

For example, the resource allocation target meets two sub-strategies in the allocation strategy 1, and two sub-strategies need to executed, therefore, the execution times of the allocation strategy 1 needs to add 2 in the hit record. For another example, the resource allocation target meets four sub-strategies in the allocation strategy 2, and four sub-strategies need to executed, therefore, the execution times of the allocation strategy 2 needs to add 4 in the hit record.

It needs to be noted that, the total amount of resources corresponding to each resource pool is preset, in order to avoid the allocated resources exceed the upper limit of resources of a target resource pool, it needs to be determined whether the total amount of allocated resources in the target resource pool is less than the upper limit of resources set by a target resource pool, if yes, resource allocation needs to be performed within the scope of resources configured by the target resource pool; if no, processing process may be stopped, without necessary to return resources. The above process is described in detail below in combination with the fifth embodiment.

Figure 5:
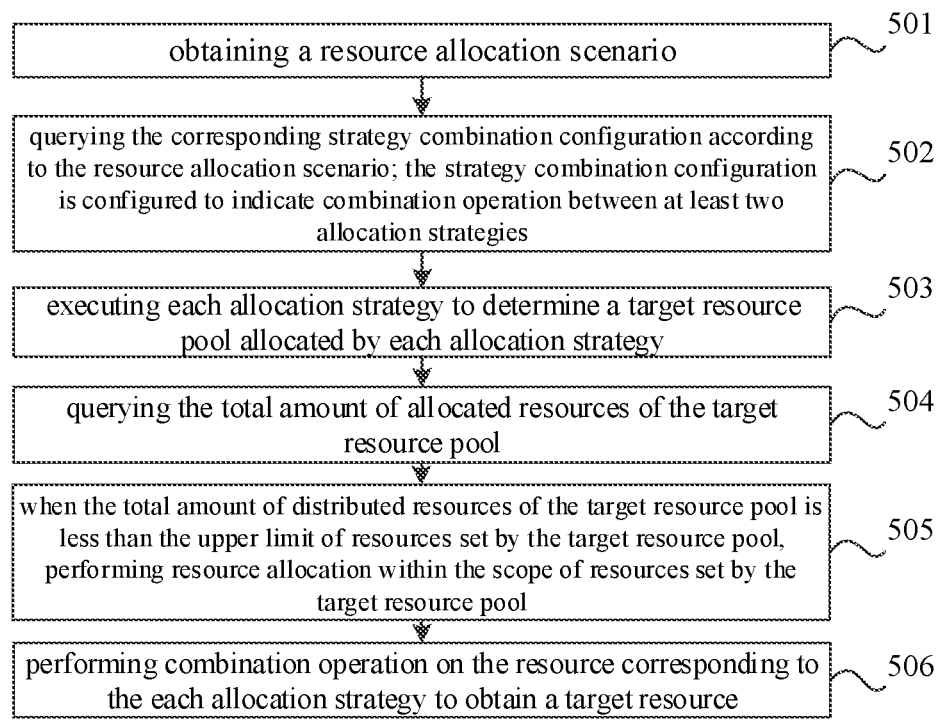
FIG. 5 is a flowchart illustrating a resource processing method provided in a fifth embodiment of the present disclosure.

FIG. 5 is a flowchart illustrating a resource processing method provided in the fifth embodiment of the present disclosure.

As illustrated in FIG. 5, the resource processing method may include following blocks:

At block 501, a resource allocation scenario is obtained.

At block 502, a corresponding strategy combination configuration is queried according to the resource allocation scenario; in which, the strategy combination configuration is configured to indicate a combination operation between at least two allocation strategies.

At block 503, each allocation strategy is executed to determine a target resource pool allocated with the allocation strategy.

The execution process of blocks 501 to 503 may refer to the execution process of the above embodiments, which will not be repeated here.

At block 504, a total amount of allocated resources of the target resource pool is queried.

In the embodiment of the present disclosure, the total amount of the allocated resources corresponding to each resource pool may be stored in the hit record, for example, the corresponding relationship between identification of each resource pool and the total amount of allocated resources in the corresponding resource pool may be stored in the hit record, so that in the present disclosure, when the target resource pool is determined, the total amount of allocated resources in the corresponding target resource pool may be queried in the hit record.

At block 505, resource allocation is performed within a scope of resources set by the target resource pool when the total amount of the allocated resources of the target resource pool is less than an upper limit of resources set for the target resource pool.

In the embodiment of the present disclosure, it may be determined whether the total amount of allocated resources in the target resource pool is less than the upper limit of resources set by a target resource pool, if yes, resource allocation needs to be performed within the scope of resources configured by the target resource pool; if no, processing process may be stopped, without necessary to return resources. For example, when the resource is a red packet, and the total amount of allocated resources of the target resource pool is greater than or equal to the upper limit of resources set by the target resource pool, an empty red packet may be returned.

At block 506, the combination operation is executed on the resources corresponding to the allocation strategy to obtain target resources.

The execution process of block 506 may refer to the execution process of block 105 in the above embodiments, which will not be repeated here.

In a possible implementation of the embodiment of the present disclosure, in order to avoid the allocated resources exceeding the upper limit of resources of a target resource pool, when resource allocation is performed within the scope of resources set by the target resource pool, the total amount of resources of the target resource pool needs to be updated and stored. For example, the total amount of allocated resources of the target resource pool may be updated and stored.

As competition in the internet industry intensifies, enterprises have increasingly higher requirements for operating activities. Enterprises not only hope to increase user stickiness, but also refine cost control, which causes that activity rules in each APP become more complicated, and the cost of customized development of activities also increases accordingly. Resources are the most common reward activities, and if low cost non-customized development or even zero development may be achieved, it is undoubtedly a huge benefit for the operation of the enterprise.

In related art, for resource activities with large differences in strategies, customized development solutions are generally adopted, that is, specific lottery codes are written in different user interaction scenarios to meet precise control of resource strategies.

In this way, there may exist following shortcomings:

First, there exists a lot of repeated developments in the early stage, which increases development cost.

Second, the maintainability of codes is not high, since a large number of repeated codes and overlong logic chains may increase the complexity of the system.

Third, the cost of adjustment is high due to following reason: for an operating activity, if the expected effects want to be achieved, the resource strategy must be dynamically adjusted according to the user's participation and cost during the activity period, and customized modification of lottery codes may cost a large number of time and labor cost. However, for activities with fixed cycle, the above situation is obviously unacceptable, therefore, only minor modifications may be selected, which generally means that it is difficult to achieve the expected effect of activities.

In the present disclosure, resource pools and allocation strategies are adjusted, to facilitate flexible configuration and meet resource allocation requirements in most scenarios. Allocation strategies and resources may be configured to avoid repeated development of codes in the related art, and when allocation strategies are adjusted, allocation strategy configuration may be flexibly adjusted according to the participation and target of the resource allocation object without necessary to modify codes, which may further reduce complexity of the system on the basis of cost saving, improve the maintainability of codes and ensure high variability of activities.

Figure 6:
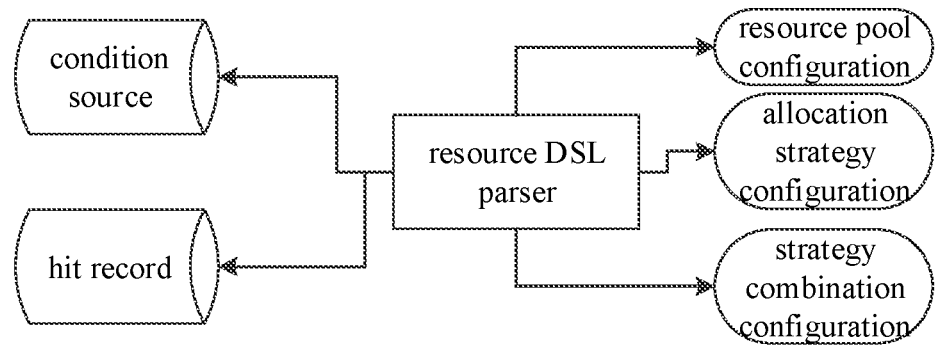
FIG. 6 is a flowchart illustrating resource processing in an embodiment of the present disclosure.

As an example, referring to FIG. 6, a resource pool, a distribution strategy and strategy combination configuration may be configured by adopting a json protocol. FIG. 6 is a flowchart illustrating resource processing in the embodiment of the present disclosure. The DSL is a domain-specific language designed for use in specific application areas; a condition source is configured to store information of the resource allocation object, for example, centering on user data; a hit record is configured to store information needed to be stored during resource allocation, for example, execution times of each strategy, the total amount of resources issued by the resource pool, and the resources allocated by the resource allocation object each time may be stored.

Taking the resource as a red packet for an example, as shown in FIG. 6, strategy combination configuration may be determined according to the current scenario, and allocation strategies of all peers may be parsed; for an allocation strategy of each peer, first verify whether the allocation strategy selected by the user reaches the upper limit according to the hit record, if yes, the process is stopped and an empty red packet is returned; if no, verify whether the user meets the sub-strategy conditions of the allocation strategy through the condition source, if yes, the selected red packet is calculated by random probability, the configuration of the red packet pool is read and the amount is calculated; if no, continue to calculate other sub-strategies; the amount of each strategy is combined, and the above amount in the hit record is stored.

In order to implement the above embodiment, the present disclosure further proposes a resource processing apparatus.

Figure 7:
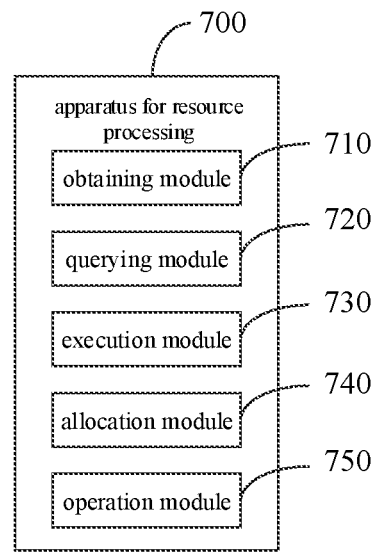
FIG. 7 is a schematic diagram 1 illustrating a structure of a resource processing apparatus provided in a sixth embodiment of the present disclosure.

FIG. 7 is a schematic diagram illustrating a structure of a resource processing apparatus provided in the sixth embodiment of the present disclosure.

As shown in FIG. 7, the apparatus 700 for resource processing includes an obtaining module 710, a querying module 720, an execution module 730, an allocation module 740 and an operation module 750.

The obtaining module 710 is configured to obtain a resource allocation scenario.

The querying module 720 is configured to query a corresponding strategy combination configuration according to the resource allocation scenario; in which, the strategy combination configuration is configured to indicate a combination operation between at least two allocation strategies.

The execution module 730 is configured to execute each allocation strategy to determine a target resource pool allocated by each allocation strategy.

The allocation module 740 is configured to obtain a resource corresponding to each allocation strategy from a target resource pool allocated with the allocation strategy.

The operation module 750 is configured to execute the combination operation on the resources corresponding to the allocation strategy to obtain target resources.

Figure 8:
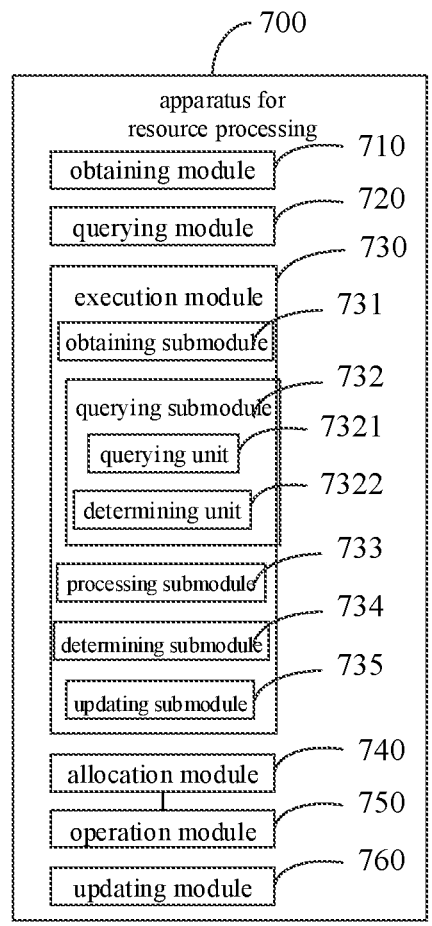
FIG. 8 is a schematic diagram 2 illustrating a structure of a resource processing apparatus provided in a sixth embodiment of the present disclosure.

Furthermore, in a possible implementation of the embodiment of the present disclosure, referring to FIG. 8, on the basis of the embodiment as shown in FIG. 7, the resource processing apparatus may further include followings.

As a possible implementation, the execution module 730 may include: an obtaining submodule 731, configured to obtain a plurality of sub-strategies contained in each allocation strategy; a querying submodule 732, configured to, query and determine, for any one sub-strategy, a target resource pool of the sub-strategy when it is determined that a resource allocation object meets a triggering condition indicated by the sub-strategy; a processing submodule 733, configured to determine target resource pools of the plurality of sub-strategies contained in the same allocation strategy as a target resource pool of the corresponding allocation strategy.

As a possible implementation, the querying submodule 732 may include: a querying unit 7321, configured to query candidate resource pools indicated by the sub-strategy and allocation probabilities of the candidate resource pools; a determining unit 7322, configured to determine the target resource pool of the sub-strategy from the candidate resource pools according to the allocation probabilities of candidate resource pools.

As a possible implementation, the querying submodule 732 is further configured to query execution times of each allocation strategy executed by the resource allocation object.

A determining submodule 734, is configured to determine that the execution times is less than an upper limit of times set for the corresponding allocation strategy.

An updating submodule 735, is configured to, update and store execution times of the corresponding allocation strategy when the resource allocation object meets a triggering condition indicated by at least one sub-strategy in the same allocation strategy.

As a possible implementation, the allocation module 740 is specifically configured to query a total amount of allocated resources of the target resource pool, and perform resource allocation within a scope of resources set by the target resource pool when the total amount of the allocated resources of the target resource pool is less than an upper limit of resources set for the target resource pool.

An updating module 760, is configured to update and store the total amount of the allocated resources of the target resource pool.

It needs to be noted that the explanation of a resource processing method in the embodiment of FIG. 1 to FIG. 6 also applies to a resource processing apparatus in this embodiment, which will not be repeated here.

The resource processing apparatus in the embodiment of the present disclosure, a resource allocation scenario is obtained, the corresponding strategy combination configuration is queried according to the resource allocation scenario, and then each allocation strategy in the strategy combination configuration is executed to determine a target resource pool allocated by each allocation strategy; and a resource corresponding to the each allocation strategy is obtained from a target resource pool allocated by the each allocation strategy; and the combination operation is executed on the resource corresponding to the each allocation strategy to obtain a target resource. In the present disclosure, the corresponding relationship between a resource allocation scenario and a strategy combination configuration is preset, and when resource allocation scenario changes, only the resource pool and the allocation strategy need to be adjusted, which facilitates flexible configuration and meets resource allocation requirements in most scenarios. Moreover, when the allocation strategy is adjusted, allocation strategy configuration may be flexibly adjusted according to the participation and target of the resource allocation object without necessary to modify codes, which may reduce complexity of the system, improve the maintainability of the code, and saving the cost at the same time.

In order to achieve the above embodiments, an electronic device is further proposed, and includes: at least one processor; and a memory communicating with at least one processor; in which, the memory stores instructions executable by the at least one processor, and the instructions are executed by the at least one processor, so that the at least one processor may execute a resource processing method according to the above embodiments of the present disclosure.

In order to achieve the above embodiments, a non-transitory computer-readable storage medium storing computer instructions is further proposed in the present disclosure, in which the computer instructions are configured to execute a resource processing method in the above embodiment of the present disclosure.

An electronic device and a readable storage medium are further provided according to embodiments of the present disclosure.

Figure 9:
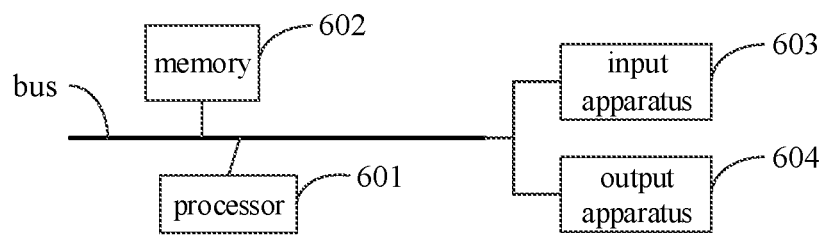
FIG. 9 is a block diagram illustrating an electronic device configured to implement a resource processing method in the embodiment of the present disclosure.

FIG. 9 is a block diagram illustrating an electronic device configured to implement a resource processing method in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As shown in FIG. 9, the electronic device includes: one or more processors 601, a memory 602, and an interface configured to connect various components, including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementation, multiple processors and/or multiple buses may be configured with multiple memories if necessary. Similarly, the processor may connect multiple electronic devices, and each device provides a part of necessary operations (for example, as a server array, a group of blade servers, or a multi-processor system). FIG. 9 takes one processor 601 as an example.

A memory 602 is a non-transitory computer-readable storage medium provided in the present disclosure. The memory stores instructions executable by the at least one processor, so that the at least one processor executes a resource processing method as described in the present disclosure. The non-transitory computer-readable storage medium of the present disclosure stores computer instructions, in which the computer instructions are configured to execute a resource processing method by a computer provided in the present disclosure.

As a non-transitory computer-readable storage medium, the memory 602 may be configured to store non-transitory software programs, non-transitory computer-executable programs and modules, such as program instructions/modules corresponding to a resource processing method in the embodiment of the present disclosure (for example, an obtaining module 710, a querying module 720, an execution module 730, an allocation module 740 and an operation module 750 as shown in FIG. 7). The processor 601 executes various functional applications and data processing of the server by running a non-transitory software program, an instruction, and a module stored in the memory 602, that is, a resource processing method in the above method embodiment is implemented.

The memory 602 may include a program storage area and a data storage area; the program storage area may store operation systems and application programs required by at least one function; the data storage area may store data created based on the use of an electronic device, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 optionally includes a memory set remotely relative to the processor 601 that may be connected to an electronic device via a network. The example of the above networks includes but not limited to an Internet, an enterprise intranet, a local area network, a mobile communication network and their combination.

An electronic device may further include an input apparatus 603 and an output apparatus 604. The processor 601, the memory 602, the input apparatus 603, and the output apparatus 604 may be connected through a bus or in other ways. FIG. 9 takes connection through a bus as an example.

The input apparatus 603 may receive input digital or character information, and generate key signal input related to user setting and function control of an electronic device, such as a touch screen, a keypad, a mouse, a track pad, a touch pad, an indicating rod, one or more mouse buttons, a trackball, a joystick and other input apparatuses. The output apparatus 604 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other.

According to the technical solution of the embodiment of the present disclosure, by obtaining a resource allocation scenario, the corresponding strategy combination configuration is queried according to the resource allocation scenario, and then each allocation strategy in the strategy combination configuration is executed to determine a target resource pool allocated by each allocation strategy; and a resource corresponding to the each allocation strategy is obtained from a target resource pool allocated by the each allocation strategy; and the combination operation is executed on the resource corresponding to the each allocation strategy to obtain a target resource. In the present disclosure, by presetting the corresponding relationship between resource allocation scenarios and strategy combination configuration, when resource allocation scenarios change, only resource pools and allocation strategies need to be adjusted, which facilitates flexible configuration and may meet resource allocation requirements in most scenarios. And, when allocation strategies are adjusted, allocation strategy configuration may be flexibly adjusted according to the participation and target of the resource allocation object, which may further reduce complexity of the system and improves the maintainability of the code on the basis of cost saving.

It should be understood that, various forms of procedures shown above may be configured to reorder, add or delete blocks. For example, blocks described in the present disclosure may be executed in parallel, sequentially, or in different orders, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A resource processing method, comprising:
   obtaining a resource allocation scenario;
   querying a corresponding strategy combination configuration according to the resource allocation scenario; wherein, the strategy combination configuration is configured to indicate a combination operation between at least two allocation strategies;
   executing each allocation strategy to determine a target resource pool allocated with the allocation strategy;
   obtaining resources corresponding to each allocation strategy from the target resource pool allocated with the allocation strategy;
   executing the combination operation on the resources corresponding to the allocation strategy to obtain target resources.

2. The method of claim 1, wherein, executing each allocation strategy to determine a target resource pool allocated with the allocation strategy comprises:
   obtaining a plurality of sub-strategies contained in each allocation strategy;
   for any one sub-strategy, querying and determining a target resource pool of the sub-strategy when it is determined that a resource allocation object meets a triggering condition indicated by the sub-strategy; and
   determining target resource pools of the plurality of sub-strategies contained in the same allocation strategy as target resource pools of the corresponding allocation strategy.

3. The method of claim 2, wherein, querying and determining the target resource pool of the sub-strategy, comprising:
   querying candidate resource pools indicated by the sub-strategy and allocation probabilities of the candidate resource pools;
   determining the target resource pool of the sub-strategy from the candidate resource pools according to the allocation probabilities of candidate resource pools.

4. The method of claim 2, wherein, before obtaining the plurality of sub-strategies contained in each allocation strategy, the method further comprises:
   querying execution times of each allocation strategy executed by the resource allocation object;
   determining that the execution times is less than an upper limit of times set for the corresponding allocation strategy.

5. The method of claim 2, wherein, after querying and determining, for any one sub-strategy, a target resource pool of the sub-strategy when it is determined that a resource allocation object meets a triggering condition indicated by the sub-strategy, the method further comprises:
   updating and storing execution times of the corresponding allocation strategy when the resource allocation object meets a triggering condition indicated by at least one sub-strategy in the same allocation strategy.

6. The method of claim 1, wherein, obtaining resources corresponding to each allocation strategy from the target resource pool allocated with the allocation strategy comprises:

querying a total amount of allocated resources of the target resource pool;

performing resource allocation within a scope of resources set by the target resource pool when the total amount of the allocated resources of the target resource pool is less than an upper limit of resources set for the target resource pool.

7. The method of claim 6, wherein, after performing resource allocation within the scope of resources set by the target resource pool, the method further comprises:

updating and storing the total amount of the allocated resources of the target resource pool.

8. A resource processing apparatus, comprising:

one or more processors;

a memory storing instructions executable by the one or more processors;

wherein the one or more processors are configured to:

obtain a resource allocation scenario;

query a corresponding strategy combination configuration according to the resource allocation scenario; wherein, the strategy combination configuration is configured to indicate a combination operation between at least two allocation strategies;

execute each allocation strategy to determine a target resource pool allocated with the allocation strategy;

obtain resources corresponding to each allocation strategy from the target resource pool allocated with the allocation strategy;

execute the combination operation on the resources corresponding to the allocation strategy to obtain target resources.

9. The apparatus of claim 8, wherein, the one or more processors are configured to:

obtain a plurality of sub-strategies contained in each allocation strategy;

query and determine, for any one sub-strategy, a target resource pool of the sub-strategy when it is determined that a resource allocation object meets a triggering condition indicated by the sub-strategy;

determine target resource pools of the plurality of sub-strategies contained in the same allocation strategy as a target resource pool of the corresponding allocation strategy.

10. The apparatus of claim 9, wherein, the one or more processors are configured to:

query candidate resource pools indicated by the sub-strategy and allocation probabilities of the candidate resource pools;

determine the target resource pool of the sub-strategy from the candidate resource pools according to the allocation probabilities of candidate resource pools.

11. The apparatus of claim 9, wherein, the one or more processors are configured to:

query execution times of each allocation strategy executed by the resource allocation object;

determine that the execution times is less than an upper limit of times set for the corresponding allocation strategy.

12. The apparatus of claim 9, wherein, the one or more processors are configured to:

update and store execution times of the corresponding allocation strategy when the resource allocation object meets a triggering condition indicated by at least one sub-strategy in the same allocation strategy.

13. The apparatus of claim 8, wherein, the one or more processors are configured to: query a total amount of allocated resources of the target resource pool, and perform resource allocation within a scope of resources set by the target resource pool when the total amount of the allocated resources of the target resource pool is less than an upper limit of resources set for the target resource pool.

14. The apparatus of claim 13, wherein the one or more processors are configured to:

update and store the total amount of the allocated resources of the target resource pool.

15. A non-transitory computer-readable storage medium storing computer instructions, wherein when the computer instructions are executed, a computer is caused to execute a resource processing method, and the method comprises:

obtaining a resource allocation scenario;

querying a corresponding strategy combination configuration according to the resource allocation scenario; wherein, the strategy combination configuration is configured to indicate a combination operation between at least two allocation strategies;

executing each allocation strategy to determine a target resource pool allocated with the allocation strategy;

obtaining resources corresponding to each allocation strategy from the target resource pool allocated with the allocation strategy;

executing the combination operation on the resources corresponding to the allocation strategy to obtain target resources.

* * * * *